United States Patent [19]
Bierlein et al.

[11] 3,937,020
[45] Feb. 10, 1976

[54] MASTER CYLINDER

[75] Inventors: Carl A. Bierlein, Kettering; Ernest D. Schaefer, Xenia, both of Ohio

[73] Assignee: General Motors Corporation, Detroit, Mich.

[22] Filed: Oct. 23, 1973

[21] Appl. No.: 408,461

Related U.S. Application Data

[63] Continuation of Ser. No. 379,349, July 16, 1973, abandoned.

[52] U.S. Cl. ............................ 60/534; 60/592
[51] Int. Cl.² .................................... B60T 17/22
[58] Field of Search ........... 60/562, 581, 592, 587, 60/588, 534; 116/118 R

[56] References Cited
UNITED STATES PATENTS

| | | | |
|---|---|---|---|
| 1,770,064 | 7/1930 | Carroll | 60/562 X |
| 2,155,270 | 4/1939 | Johnson | 116/118 R UX |
| 2,157,733 | 5/1939 | Sessions | 60/562 |
| 2,217,461 | 10/1940 | Weihe | 60/587 |
| 2,374,142 | 4/1945 | Steven | 116/118 R X |
| 2,671,424 | 3/1954 | Herring et al. | 116/118 R |
| 2,781,432 | 2/1957 | Ferrara et al. | 116/118 R |
| 2,917,924 | 12/1959 | Messick | 116/118 R X |
| 2,958,198 | 11/1960 | Moyer | 60/581 X |
| 3,059,671 | 10/1962 | Kings | 60/592 X |
| 3,147,596 | 9/1964 | Wallace | 60/562 |
| 3,206,933 | 9/1965 | Degg | 60/588 X |
| 3,291,263 | 12/1966 | Lepelletier | 188/52 |
| 3,520,136 | 7/1970 | Stiward | 60/592 X |
| 3,593,271 | 7/1971 | Schrader | 200/84 R |
| 3,609,975 | 10/1971 | Lewis et al. | 60/592 X |

FOREIGN PATENTS OR APPLICATIONS

| | | | |
|---|---|---|---|
| 960,412 | 6/1964 | United Kingdom | 60/592 |

*Primary Examiner*—Martin P. Schwadron
*Assistant Examiner*—H. Burks
*Attorney, Agent, or Firm*—D. D. McGraw

[57] ABSTRACT

A dual master cylinder has a cylinder housing in which one bore is provided. A pair of pressurizing pistons are mounted in tandem in the bore to define therewith a pair of pressurizing chambers. Each chamber is connected to a separate brake circuit. The cylinder housing also has formed in it a pair of secondary reservoir chambers which are connected to the bore by compensation ports. A single primary reservoir chamber is formed by a stamped metal reservoir body which is secured to the cylinder housing over the secondary reservoir chambers so as to cover those chambers and seal them. Fluid transfer ports through the bottom of the reservoir body connect with the secondary reservoir chambers, and have their axes axially misaligned relative to the axes of the compensation ports so that fluid returning to the reservoirs through the compensation ports will not be able to enter the primary reservoir chamber when a squirting action takes place. A fluid level sensor is mounted in the side of the reservoir body so that it senses the level of brake fluid in the primary reservoir chamber. The reservoir body has a sealed diaphragm and cover which closes the primary reservoir chamber.

7 Claims, 2 Drawing Figures

MASTER CYLINDER

This is a continuation of our application Ser. No. 379,349, filed July 16, 1973.

The invention relates to a master cylinder having a plurality of pressurizing chambers formed in a bore in a cylinder housing. More particularly, the invention relates to the provision of a secondary reservoir chamber for each pressurizing chamber, the secondary reservoir chambers being connected to the bore by means of compensation ports so that the fluid in the pressurizing chambers and the circuits connected to them may be compensated. The secondary chambers are defined primarily by the cylinder housing and are covered by a stamped or formed reservoir body which is secured by suitable means, preferably welding, to the cylinder housing so as to seal the secondary reservoir chambers. The reservoir body defines a single primary reservoir chamber which is connected to the secondary reservoir chambers by fluid transfer ports formed in the bottom of the reservoir body. The axes of these fluid transfer ports are axially misaligned relative to the axes of the compensation ports so as to prevent the squirting of fluid through the compensation ports and into the primary reservoir chamber when brake fluid is returned under pressure to the reservoirs. A fluid level sensor is mounted on the reservoir body and extends into the primary reservoir chamber so as to sense the level of brake fluid therein.

In the preferred embodiment the assembly combines a permanent mold iron cylinder body with a stamped steel primary reservoir body. The body and reservoir are welded together using a low energy weld technique such as ultra-pulse welding. The volume of fluid contained in either of the secondary chambers will be adequate to provide a reasonable number of vehicle stops if a partial system failure occurs which depletes the supply of fluid in the primary reservoir chamber and in one of the secondary reservoir chambers. The fluid transfer ports are located away from the side walls of the secondary chambers so that they will not allow transfer of fluid to the failed system during downhill driving, high deceleration stops, or cornering.

The use of a single chamber primary reservoir permits the use of a single fluid level sensor. Since excessive usage of fluid by either of the two brake systems connected to the master cylinder will lower the fluid level in the primary reservoir chamber, a single sensor can be used to detect either a pressure loss or excessive lining wear. The single sensor simplifies the arrangement and results in a more economical assembly.

Figure 1:
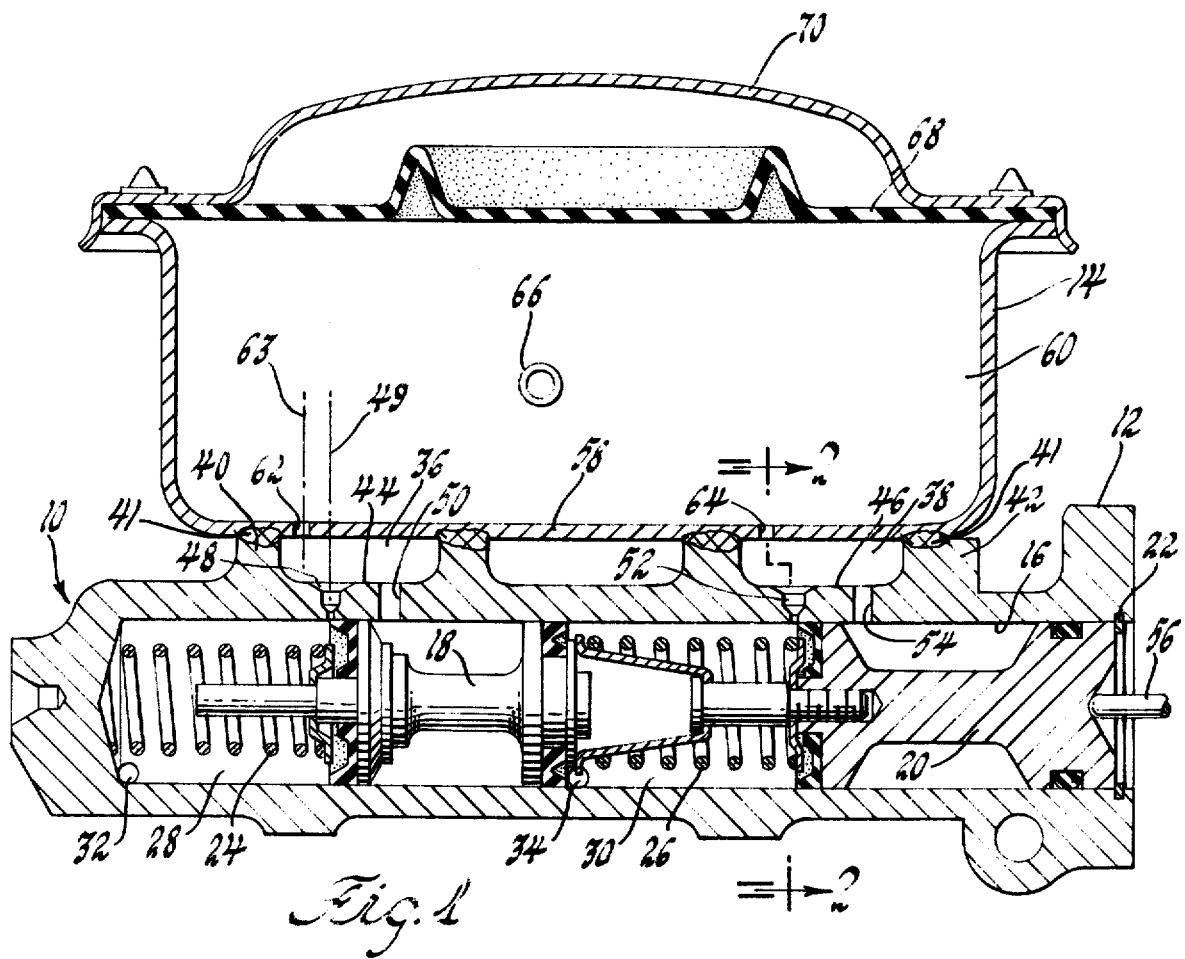
FIG. 1 shows a master cylinder assembly in crosssection and embodying the invention.
Figure 2:
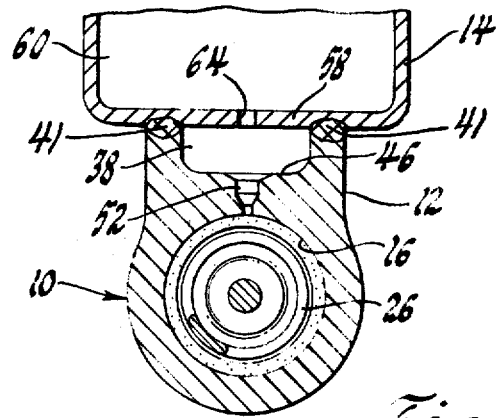
FIG. 2 is a sectional view of the assembly of FIG. 1 taken in the direction of arrows 2—2 of that FIGURE.

The master cylinder assembly 10 includes a cylinder housing 12 and a reservoir body 14. The cylinder housing is preferably a permanent mold iron housing, but may be made of other materials and by other processes while embodying the invention. A bore 16 is provided in the housing 12 and pressurizing pistons 18 and 20 are reciprocably mounted in the bore. A piston stop 22 cooperates with the rear end of piston 20 and the piston return springs 24 and 26 to define the release positions of the pistons, shown in the drawing. The pistons cooperate with the bore 16 to define first and second pressurizing chambers 28 and 30. Outlets 32 and 34 are respectively connected to different brake fluid circuits in a vehicle brake system, all in a manner well known in the art.

The upper portion of the cylinder housing 12 is formed to provide secondary fluid reservoir chambers 36 and 38. The chambers are defined in part by their respective side walls 40 and 42 and their bottom walls 44 and 46. These walls are integral parts of the cylinder housing 12. The side walls are preferably flat on their upper surfaces so as to receive the flat bottom of the reservoir body 14 thereon in sealing relation. The bottom of reservoir body 14 therefore provides closing means for the individual reservoirs. The compensating ports 48 and 50, formed through bottom wall 44, connect the secondary reservoir chamber 36 with the bore 16. The compensating ports 52 and 54, formed through the bottom wall 46 connect the secondary reservoir chamber 38 with the bore 16. Ports 48 and 52 communicate with the pressurizing chambers 28 and 30, respectively, when the master cylinder is in the release position shown. As is common in the art, these ports are closed by suitable piston seals or cups when the pistons are moved in a pressurizing direction by movement of the push rod 56, and are uncovered as the pistons return to the release position and are positioned by stop 22. Ports 48 and 52 are also positioned substantially centrally of the bottom walls 44 and 46 of the secondary reservoir chambers 36 and 38.

The bottom wall 58 of the reservoir body 14 is secured to the side walls 40 and 42 so that it closes the secondary reservoir chambers. This securing is preferably accomplished by use of a low-energy weld technique, such as ultra-pulse welding, indicated by intersecting cross hatching at 41. The reservoir body 14 defines the primary reservoir chamber 60 of the master cylinder assembly. This is a single chamber and is connected to the two secondary chambers through fluid transfer ports 62 and 64. These ports are provided in the bottom wall 58 of the reservoir body and communicate with their respective secondary reservoir chambers 36 and 38. Port 62, for example, is positioned away from side wall 40 and has its axis 63 axially misaligned relative to the axis 49 of compensating port 48. Port 64 is similarly positioned relative to side wall 42 and the port 52. This arrangement prevents undue transfer of fluid from one secondary reservoir chamber to the other during downhill driving, high deceleration stops, cornering, or during master cylinder compensation after a normal brake apply. This is particularly important when one circuit has suffered a loss of fluid and would lose any additional fluid received by it.

A suitable fluid level sensor 66 is provided which will sense the level of fluid in chamber 60. In the preferred embodiment this may be a single bi-metal sensor, but other fluid level sensors may be used. Chamber 60 is covered by a diaphragm 68 and a reservoir cover 70. Thus the reservoir chamber 60 is sealed from direct atmospheric contact.

In normal operation, reservoir chamber 60 is filled with brake fluid to a point well above the fluid level sensor 66. It maintains this level during brake operation, subject only to brake lining wear which requires additional fluid displacement in the circuits, and possible pressure loss in one or both of the circuits. If, for example, the brake linings wear sufficiently, without any pressure loss having occurred, to require enough fluid to uncover the fluid level sensor 66, it will indicate that the level is sufficiently low to require checking. The cause may be readily determined. If one of the circuits, for example the circuit connected to outlet 32, develops a leak and a resulting pressure and fluid volume loss, the fluid in chamber 60 can be depleted to a point below that of the fluid level sensor 66 and it will again signal such a low level. Should the condition continue, the fluid level may be well below the sensor and can even be fully depleted out of the primary reservoir chamber 60. Again, assuming the circuit outlet 32 is the circuit suffering a loss of fluid, the secondary reservoir chamber 36 can be depleted of fluid without affecting the fluid contained in the secondary reservoir chamber 38. Thus there will be sufficient fluid to continue operating the brake circuit connected to outlet 34.

An economical master cylinder has been disclosed which provides for sensing of the brake reservoir fluid level by use of a single sensor in a single large reservoir while at the same time providing secondary reservoir chambers for independent circuit reservoir capability when the fluid level drops below a predetermined point. The secondary reservoir chambers are provided as an integral part of the cylinder housing, with the reservoir body defining the primary reservoir chamber being secured to the cylinder housing so as to cover the secondary reservoir chambers and to provide fluid connection with the single primary reservoir chamber. This results in a lighter weight master cylinder assembly than would be the case should the entire reservoir body also be made of a cast material, usually integrally with the cylinder housing as is in the current art. It also provides for easy manufacture of a system having a single primary reservoir chamber and a pair of secondary reservoir chambers.

It is claimed:

1. A multiple circuit master cylinder assembly having a pressurizing chamber for each circuit and an individual fluid reservoir for each pressurizing chamber and a single primary fluid reservoir for all of said individual fluid reservoirs,
   a body defining said pressurizing chambers and said individual fluid reservoirs with open individual reservoir tops defining a lip in a substantially regular surface,
   a second body secured to said one body and of mating conformation at said surface and closing said individual reservoir tops so as to define a bottom surface that bears against the entirety of the lip, the second body further having fluid transfer ports of small cross section in relation to the reservoirs therethrough providing continuous fluid communication between said primary reservoir and said individual reservoirs,
   and a fluid level sensor sensing at least a decrease in fluid level below a predetermined level in said primary fluid reservoir.

2. A multiple circuit master cylinder assembly having a pressurizing chamber for each circuit and an individual fluid reservoir for each pressurizing chamber and a single primary fluid reservoir for all of said individual fluid reservoirs,
   a cast first body defining said pressurizing chambers and said individual fluid reservoirs with open individual reservoir tops defining a lip in a substantially regular surface,
   a stamped metal second body welded to said first body and of mating conformation at said surface and closing said individual reservoir tops so as to define a bottom surface that bears against the entirety of the lip, the second body further having fluid transfer ports of small cross section in relation to the reservoirs therethrough providing continuous fluid communication between said primary reservoir and said individual reservoirs,
   and a fluid level sensor sensing at least a decrease in fluid level below a predetermined level in said primary fluid reservoir.

3. A multiple circuit master cylinder assembly having a pressurizing chamber for each circuit and an individual fluid reservoir for each pressurizing chamber and a single primary fluid reservoir for all of said individual fluid reservoirs,
   a body defining said pressurizing chambers and said individual fluid reservoirs with open individual reservoir tops defining a lip in a substantially regular surface,
   a second body secured to said one body and of mating conformation at said surface and closing said individual reservoir tops so as to define a bottom surface that bears against the entirety of the lip, the second body further having fluid transfer ports of small cross section in relation to the reservoirs therethrough providing continuous fluid communication between said primary reservoir and said individual reservoirs,
   said first body having compensation ports between said individual reservoirs and said pressurizing chambers, the axes of said compensation ports being offset from the axes of said fluid transfer ports to minimize the flow of return compensating fluid under pressure to said primary fluid reservoir by a squirting action,
   and a fluid level sensor sensing at least a decrease in fluid level below a predetermined level in said primary fluid reservoir.

4. A multiple circuit master cylinder assembly having a pressurizing chamber for each circuit and an individual fluid reservoir for each pressurizing chamber and a single primary fluid reservoir for all of said individual fluid reservoirs,
   said pressurizing chambers and said individual fluid reservoirs being formed in one body with open individual reservoir tops,
   said primary fluid reservoir being formed in a second body secured to said one body and closing said individual reservoir tops and having fluid transfer ports therethrough providing continuous fluid communication between said primary fluid reservoir and said individual reservoirs,
   and a fluid level sensor sensing at least a decrease in fluid level below a predetermined level in said primary fluid reservoir.

5. A multiple circuit master cylinder assembly having a pressurizing chamber for each circuit, an individual fluid reservoir for each pressurizing chamber, compensation ports connecting the associated pressurizing chambers and individual fluid reservoirs, and a single primary fluid reservoir for all of said individual fluid reservoirs,
   said pressurizing chambers and said individual fluid reservoirs being formed in one body with open individual reservoir tops,
   said primary fluid reservoir being formed in a second body secured to said one body and having means closing said individual reservoir tops, said closing means having fluid transfer ports therethrough providing continuous fluid communication between said primary fluid reservoir and said individual reservoirs, and a fluid level sensor sensing at least a decrease in fluid level below a predetermined level in said primary fluid reservoir.

6. A multiple circuit master cylinder assembly having a pressurizing chamber for each circuit and an individual fluid reservoir for each pressurizing chamber and a single primary fluid reservoir for all of said individual fluid reservoirs, said pressurizing chambers and said individual fluid reservoirs being formed in one body with open individual reservoir tops, said primary fluid reservoir being formed in a second body secured to said one body and closing said individual reservoir tops and having fluid transfer ports therethrough providing continuous fluid communication between said primary fluid reservoir and said individual reservoirs, said first body being a casting and said second body being a stamped metal body welded to said first body at said individual reservoir tops, and a fluid level sensor sensing at least a decrease in fluid level below a predetermined level in said primary fluid reservoir.

7. A multiple circuit master cylinder assembly having a pressurizing chamber for each circuit and an individual fluid reservoir for each pressurizing chamber and a single primary fluid reservoir for all of said individual fluid reservoirs, said pressurizing chambers and said individual fluid reservoirs being formed in one body with open individual reservoir tops, said primary fluid reservoir being formed in a second body secured to said one body and closing said individual reservoir tops and having fluid transfer ports therethrough providing continuous fluid communication between said primary fluid reservoir and said individual reservoirs, said one body having compensation ports between said individual reservoirs and said pressurizing chambers the axes of which are offset from the axes of said fluid transfer ports to minimize the flow of return compensating fluid under pressure to said primary fluid reservoir by a squirting action, and a fluid level sensor sensing at least a decrease in fluid level below a predetermined level in said primary fluid reservoir.

* * * * *